US008010641B2

(12) United States Patent  (10) Patent No.: US 8,010,641 B2
Keller  (45) Date of Patent: Aug. 30, 2011

(54) METHOD FOR COUPLING ONLINE AND INTERNET SERVICES

(75) Inventor: Walter Keller, Ratingen (DE)

(73) Assignee: T-Mobile Deutschland GmbH, Bonn (DE)

( * ) Notice: Subject to any disclaimer, the term of this patent is extended or adjusted under 35 U.S.C. 154(b) by 1220 days.

(21) Appl. No.: 10/398,331

(22) PCT Filed: Oct. 2, 2001

(86) PCT No.: PCT/DE01/03783
§ 371 (c)(1),
(2), (4) Date: Jul. 3, 2003

(87) PCT Pub. No.: WO02/03008
PCT Pub. Date: Apr. 11, 2002

(65) Prior Publication Data
US 2004/0030767 A1    Feb. 12, 2004

(30) Foreign Application Priority Data
Oct. 5, 2000  (DE) .................................. 100 49 618

(51) Int. Cl.
*G06F 15/173*  (2006.01)
(52) U.S. Cl. .......... 709/223; 709/218; 709/227; 455/26; 455/39; 455/414
(58) Field of Classification Search .................. 709/223, 709/218, 227; 455/26, 39, 414
See application file for complete search history.

(56) References Cited

U.S. PATENT DOCUMENTS

| | | | |
|---|---|---|---|
| 6,195,533 B1 * | 2/2001 | Tkatch et al. ................ | 340/7.29 |
| 6,233,688 B1 * | 5/2001 | Montenegro .................... | 726/11 |
| 6,742,036 B1 * | 5/2004 | Das et al. ....................... | 709/226 |
| 6,771,649 B1 * | 8/2004 | Tripunitara et al. ..... | 370/395.54 |
| 6,904,026 B1 * | 6/2005 | Tarnanen et al. ............. | 370/329 |
| 6,910,074 B1 * | 6/2005 | Amin et al. .................... | 709/227 |
| 6,957,248 B2 * | 10/2005 | Quine et al. ................... | 709/206 |
| 2001/0032154 A1 * | 10/2001 | Schummer ....................... | 705/30 |
| 2002/0023135 A1 * | 2/2002 | Shuster ........................ | 709/206 |

(Continued)

OTHER PUBLICATIONS

G. Bader, Freemail: der Mobile Buero-Service fuer Unterwegs Statt Notebook, in *Chip Zeitschrift fuer Mikrocomputer-Technik* (Vogel Verlag: Wurzburg, Germany, 1999), No. 8, Aug. 1999, pp. 182-183 (the whole document); and.

(Continued)

*Primary Examiner* — Tina Nguyen
(74) *Attorney, Agent, or Firm* — Lackenbach Siegel LLP; Myron Greenspan

(57) ABSTRACT

A method couples online and Internet services. Previously, personalized services in particular (e-mail etc.) are only available from Internet service providers via the telecommunications network and RAS/RADIUS access and not via the public Internet. Now the ISP is equipped with an open Internet application platform (OIA) coupled so that the ISP customer can take advantage of an extended range of services compared to usual Internet customers, even during access via the Internet. The method permits e-mails to be re-directed from the ISP server with a known address to the OIA platform, in such a way that the customer can use these services worldwide via the public Internet using any terminal via any network. One example is the use of a T-Online e-mail account from the fixed network and mobile telecommunications network, from home, at work and while travelling via foreign telephone networks and local and foreign company networks/ LAN access.

9 Claims, 4 Drawing Sheets

U.S. PATENT DOCUMENTS

| | | | |
|---|---|---|---|
| 2002/0058499 A1* | 5/2002 | Ortiz | 455/412 |
| 2005/0086316 A1* | 4/2005 | Chen | 709/207 |
| 2005/0111439 A1* | 5/2005 | Yarlagadda et al. | 370/352 |
| 2006/0178136 A1* | 8/2006 | Irlam et al. | 455/414.1 |
| 2007/0050481 A1* | 3/2007 | Rigole | 709/219 |
| 2008/0077482 A1* | 3/2008 | Tota et al. | 705/10 |
| 2008/0109531 A1* | 5/2008 | Jenkins | 709/218 |

OTHER PUBLICATIONS

T.Y.C. Woo et al., "Providing Internet services to mobile phones: a case study with e-mail," in *Personal, Indoor and Mobile Radio Communications,* 1998—*The Ninth IEEE International Symposium,* Sep. 8-11, 1988, Boston, Massachusetts, U.S.A. (*IEEE,* New York, NY U.S.A., Sep. 8, 1998), pp. 99-105 (the whole document).

* cited by examiner

METHOD FOR COUPLING ONLINE AND INTERNET SERVICES

BACKGROUND OF THE INVENTION

1. Field of the Invention

The invention relates to a method for coupling online and Internet services.

2. Description of the Prior Art

A significant application field of the Internet technique today is the electronic mail operation (e-mail). For this purpose, for example, the Simple Mail Transfer Protocol is employed. It is based on the TCP/IP protocol and consequently is continuously applicable in the public Internet, as well as also in most Local Area Networks (LAN).

This e-mail service is also made available for example to most customers of so-called online services (for example T-online, AOL, etc.). Internet Access Providers (IAPs) as well as Internet Service Providers (ISP), who have at their disposal their own service offers, make available such services. All of these service providers make possible for customers, who are connected across telecommunication networks, access to the Internet and, if necessary, make available IP-based services. In the following these service offers are collectively referred to as ISP.

To some extent telecommunication network operators also offer IP-based services as well as the transition to the Internet. This takes place, for example, in the GSM mobile radio network by means of WAP platform (Wireless Application Protocol). Such services are accessible to internal customers but not to Internet customers.

In addition, there are so-called freemail providers in the Internet (cf. freemail Anbieter im Test, in *Tomorrow*, Edition 7/2000). These providers also make e-mail services and other services available. In contrast to online services and IAPs (ISPs), they do not have at their disposal dial-up nodes to telecommunication networks but rather make available host computers with Internet connection in the Internet. Accordingly, they can be contacted by customers in a second step only after they have already been switched through to the Internet via an ISP, for example. Such freemail applications in the Internet are financed most often through advertisement revenues and are free of charge to the user, while the ISP, as a rule, concludes a contract with his customers and levies charges accordingly.

Customers of an e-mail service always have a so-called account. This is a protected access to their own mail stored on the server. The advantage of the ISPs compared to the freemail provider consists most often in the comfortable and rapid access type, in appropriately protected accesses and in less advertisement.

Freemail accesses are most often protected by user identification (name) and by a simple password. The danger of misuse is here relatively great. Once a connection has been established, the data transfer is most often protected through additional security protocols, for example Secure Sockets Layer (SSL). The great advantage of the freemails comprises that these services are accessible from every Internet connection worldwide, while ISP services, as a rule, are only accessible from the home PC, since the access parameters (telephone connection) are used as a security criterion in the access procedure.

A mobile customer has here various restrictions. While the capability is given of using these parameters in other PCs also, however, it fails most often because the foreign PCs often cannot be configured appropriately. For example PC work places in business networks comprise as a rule server-based operating systems, such as Microsoft Windows NT or UNIX and cannot be individually configured by the user.

The mobile ISP customer consequently has considerable disadvantages when using his ISP e-mail account. The disadvantages become greater if the e-mail provider offers not only mail services but rather an expanded offer for example Unified Messaging, etc. (cf. Unified Messaging Anbieter im Vergleich, in *Tomorrow*, edition 7/2000). In this case extensive services for the ISP customer are omitted. For that reason increasingly more ISP customers are switching to freemail providers in order to be able to receive at least their e-mail everywhere.

SUMMARY OF THE INVENTION

The present invention addresses the problem of proposing a method on the basis of which simple and location-independent access of mobile customers to e-mail services and other services of their online or ISP contract partners can be realized.

The current problem that in particular personalized services (e-mail etc.) with Internet service providers and online providers are only reachable via telecommunication network and RAS/RADIUS access, not however across the public Internet, is solved in the manner that the ISP is equipped with an Open Internet Application platform (OIA) (for example freemail platform) and the platforms are coupled in a manner such that the ISP customer can also utilize, when accessing via the Internet, a service offer which, compared to the conventional Internet customers, is expanded.

According to the invention, services such as for example e-mail services, messaging etc., which as a rule are only available to contract customers/network customers with access via telecommunication network and RAS/Radius-protected authentication procedure via which generally accessible Internet interfaces are reached. The contract customer can hereby always be reached via his ISP e-mail address and can utilize the mail account, if necessary, via the public Internet from any desired terminal.

BRIEF DESCRIPTION OF THE DRAWINGS

The invention will be explained utilizing the Figures in the drawing, which here only describe a feasible embodiment in schematic representation, and further characteristics, advantages and application fields will become evident based on the Figures. In the drawing show.

DETAILED DESCRIPTION

Figure 2:
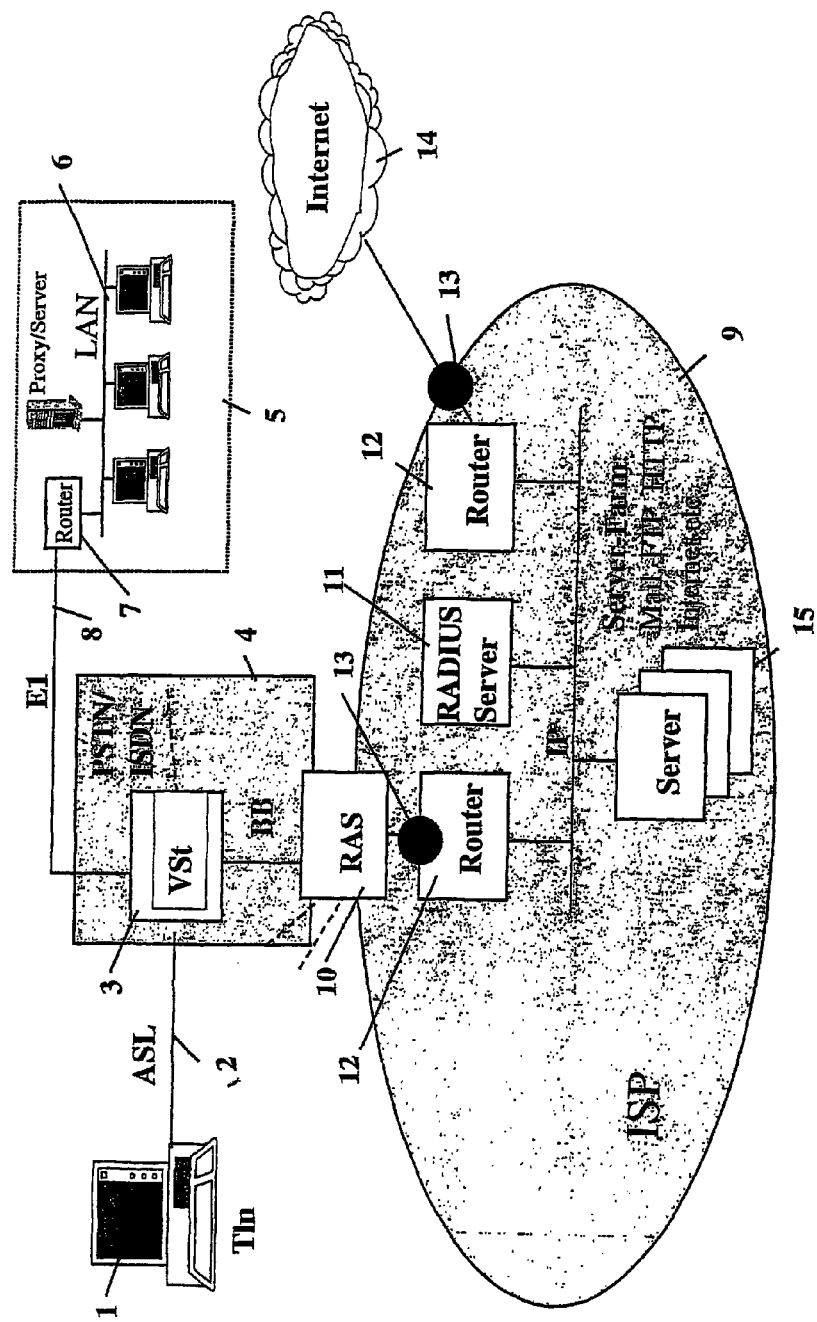

FIG. 2 depicts the conventional procedure during utilization of e-mail services by the customer of an online or Internet service provider 9. The customer terminal 1 (subscriber Tln) is connected via a connection line 2 to the exchange 3 (VSt) of a telecommunication network 4. A comparable situation exists for business customers 5. The local network 6 (LAN) is connected via a router 7 and, as a rule, a superior interface 8 (for example CCITT/ITU-E1 link with 2048 Mbit/s) to an exchange 3.

The transition from the communication network 4 to the Internet service provider (ISP) 9 takes place by means of logging on via a Remote Access Server (RAS) 10. With the support of an installed RADIUS client, the RAS 10 first establishes the connection with the radius server 11 of the ISP. The radius server 11 is responsible for Authentication, Authorization and Accounting (AAA). Therewith the access rights are verified and the service as such can be assessed a fee. As a rule, the ISP 9 calculates a basic monthly fee, a time-based access fee as well as diverse service costs and often affects settlement of the account of the customer via the telephone bill of the telecommunication company.

The input and output points of the ISP 9 are as a rule equipped with routers 12 for the purpose of routing the IP protocols as well as additionally with so-called firewalls 13 (here represented as a dot). Firewalls 13 permit the monitoring of the data traffic and the blocking of undesirable accesses. Consequently, they offer more security for the network of the ISP 9 as well as for its services and the data contents of the customers. Access from the Internet to the server farm 15 of the ISP 9 (for example e-mail) is therefore not possible for reasons of security.

The location of the servers 15 in a region protected in this way is also denoted as Demilitarized Zone (DZ).

Figure 3:
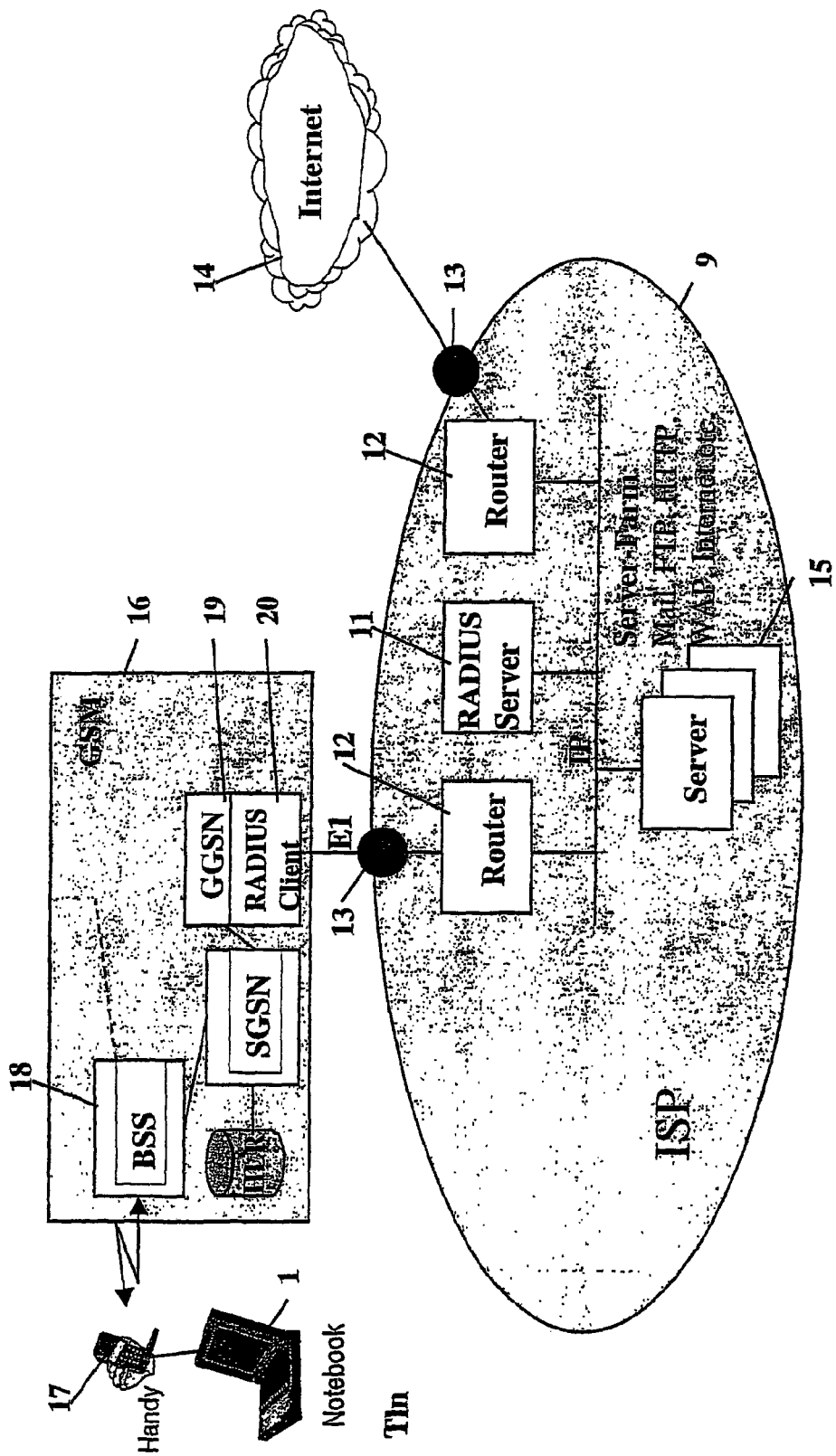

FIG. 3 depicts by example the access to e-mail services etc. from a mobile radio network, for example the GSM network 16 (cf. The GSM System for Mobile Communications, Michel Mouly, Marie-Bernadette Pautet, Cell&Sys-Verlag, France, 1992, ISBN 2-9507190-0-7it.3) by means of GPRS Service (cf. GSM 03.60, Digital cellular telecommunications system, General Packet Radio Service (GPRS) Service Description, ETSI). The customer terminal 1, here for example a notebook, is connected to a mobile radio end terminal 17, by means of which a connection to a base station system 18 of the mobile radio network 16 is established. The Radius client 20 is here already in a network node 19 (GPRS Gateway Support Node, GGSN). Via the mobile radio network 16 a connection to the Internet service provider 9 is established. The mobile radio customer can be internationally mobile. In the case of roaming, however, a connection from the visited network (visitor network) to the contract network (home network) exists internal to the network. The roaming case therefore represents a special solution. It is limited to contract partners of the mobile radio operator, who have comparable technical equipment, enabled GPRS service as well as a roaming contract with the home network.

Apart from these special cases, even with mobility in other networks, the access to the ISP 9 is conducted through the contract network to the ISP 9 in the same manner as with stationary visiting. The access principle is therewith in all cases for land-line networks and mobile radio customers (private and business customers) comparable with FIG. 2. It is therefore not differentiated into different access networks in the further text.

Figure 4:
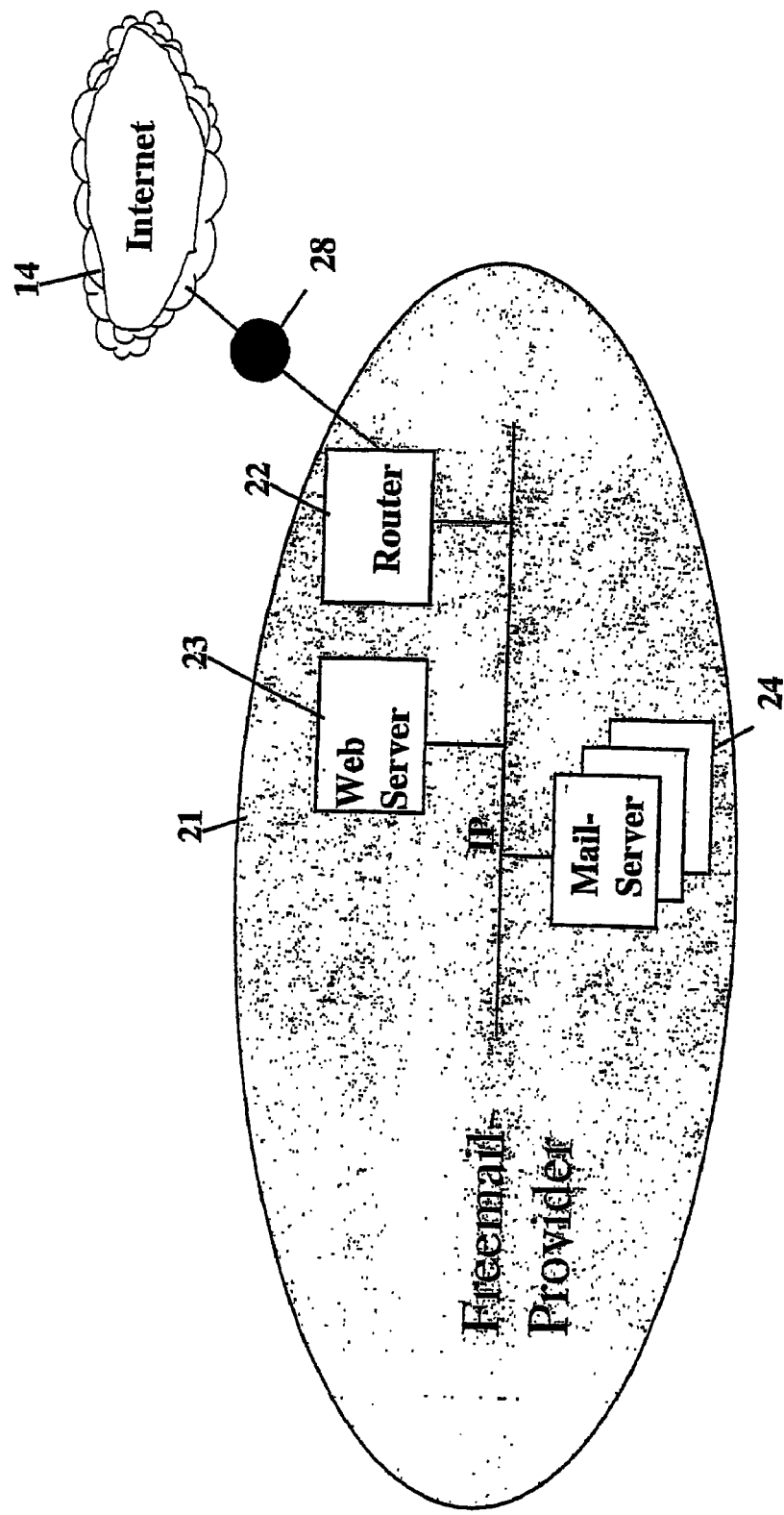

FIG. 4 shows by example the host configuration of a freemail provider 21. The service access to the Internet 14 is made available via Internet connection 22 (router). Optionally an additional firewall 28, primarily for the protection of one's own equipment, is available.

A web server 23 terminates the communication with the customer, identifies user ID and password and permits the access to the mail server 24. A security protocol (for example SSL) can be operated for example in the router 22, in the web server 23, or in the e-mail server 24.

Figure 1:
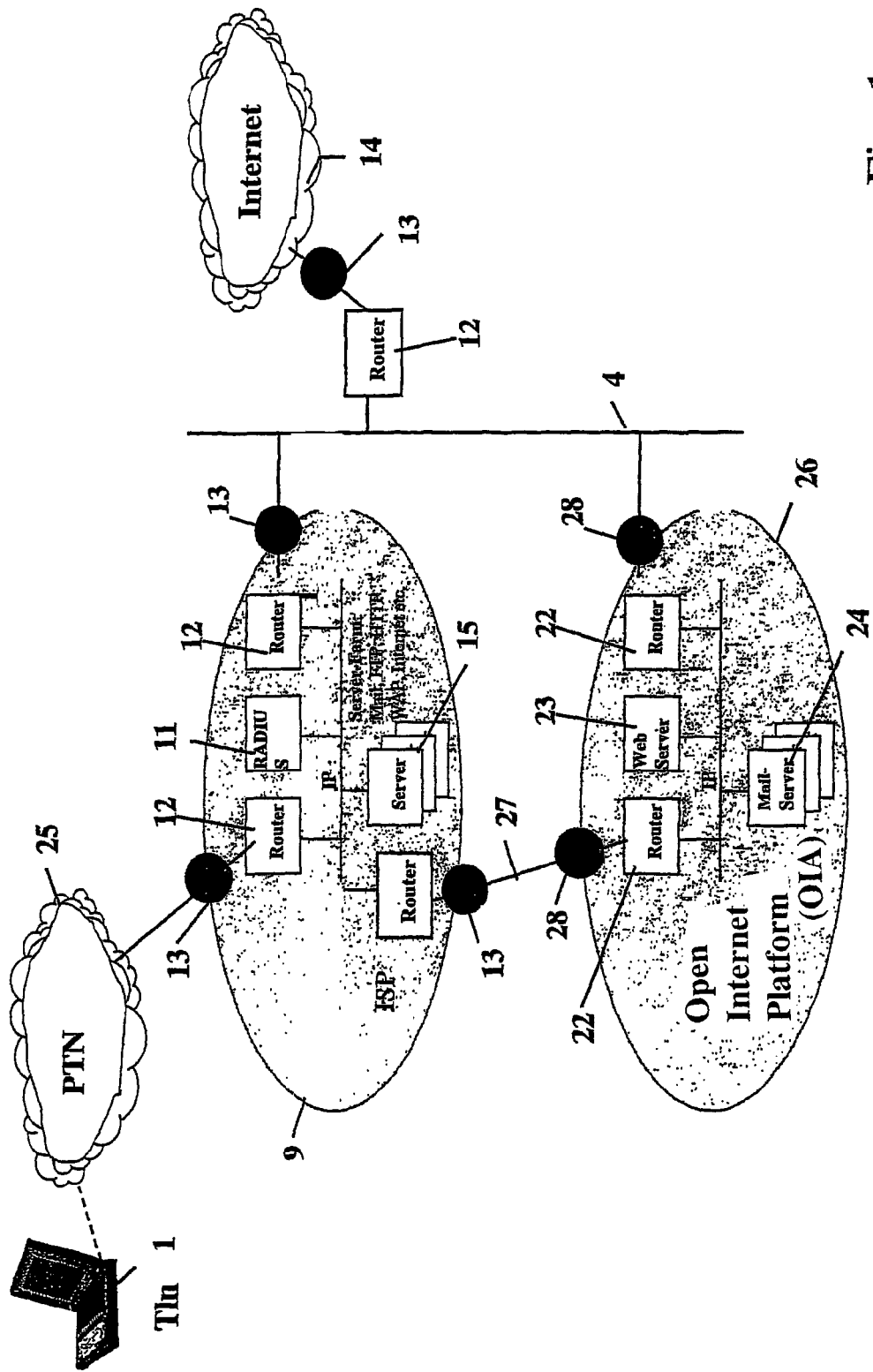
FIG. 1 service offer combined, according to the invention, with coupled ISP and OIA platform FIG. 2 ISP access via land-line telephone network according to prior art, FIG. 3 ISP access via mobile radio network according to prior art FIG. 4 freemail platform according to prior art.

FIG. 1 shows by example a realization according to the invention for the realization for coupling Internet and online services. Both service offers are combined such that the RAS-side access is realized via telecommunication network from the customer to the ISP 9, and an Internet-side offer (Open Internet Application, OIA) of the ISP is also made available.

The customer terminal 1 is connected via a telecommunication network 25 to the Internet service provider 9, and can utilize its services as well as also services in the Internet 14, which are made available for example by the Open Internet Platform (OIA).

Any customer from the Internet 14 or any ISP customer, who logged onto the e-mail server 24 of the OIA platform 26, can now set up and operate an e-mail account (freemail account) in the already described procedure.

In addition, in this configuration the capability is given for contract customers of the ISP 9 to redirect their e-mail of the ISP platform onto the e-mail server 24 of the OIA platform 26 and, if necessary, conversely. This service can be administered at the RAS side as well as optionally at the Internet side. Consequently, the customer utilizes also for the freemail account his existing e-mail address of the ISP network.

Hereby the contract customer is always reachable via his ISP e-mail address and yet can utilize the mail account if needed also via the public Internet from any desired terminal.

The high security standard of the ISP for contract customer continues to be safeguarded, however, the business field can also be expanded to Internet customers.

The schematic illustration shows physically completely separate platforms, independent e-mail servers 15 and 24 and a connection 27, internal to the provider, between the platforms 9 and 26. Hereby the highest security is given.

Alternatively, the physical separation can also be partially or completely replaced by a logical separation, thereby that in ISP 9 and OIA 26 at least partially the same hardware equipment is used. In this case different logical networks are generated, which are secured through different IP addressing as well as, if necessary, different hardware interfaces and separate software procedures. Herein for example two independent e-mail servers can be set up on a host computer, or an e-mail database with combined access procedures is set up.

The highest security however is represented by the independent hardware platform.

DRAWING LEGEND

1 Customer terminal
2 Connection line
3 Exchange
4 Telecommunication network
5 Business customer
6 LAN (Local Area Network)
7 Router
8 Interface
9 Internet Service Provider (ISP)
10 Remote Access Server (RAS)
11 Radius server
12 Router
13 Firewall
14 Internet
15 Server farm
16 GSM mobile radio network
17 Mobile radio end terminal
18 Base station system
19 Network node (GGSN)
20 Radius client
21 Freemail provider
22 Internet connection router
23 Web server
24 Mail server 25 Telecommunication network
26 Open Internet Platform (OIA)
27 Interface
28 Firewall

The invention claimed is:

1. Method of coupling online and Internet services subscribed from Internet Service Provider for providing general and personalized services as well as personal customer data of online services comprising the steps of:
   (a) providing access to a customer by means of a customer terminal to telecommunication networks and Internet service providers by means of secured access via an Internet interface of the Internet service provider and at least one firewall for use of these services including at least one of utilization, setting up and changing of these services;
   (b) permitting these services with a worldwide access independent of a particular telecommunication network and independent of a particular customer terminal employed;
   (c) providing the Internet service provider with an Open Internet Platform (OIA) comprising a router, a web server and a mail server;
   (d) coupling the Internet Service Provider and the OIA platform by means of a connection interface to allow an ISP customer to utilize a service offer via the Internet, and redirecting an ISP mail account subscribed services from the ISP into the OIA platform in order for the customer to obtain access that is independent of the customer's location, independent of a particular customer terminal and independent of a telecommunication access network used by the customer, the administration of the Internet access taking place at least on a remote access server (RAS) side through the ISP contract customer; and
   wherein the additional service platform OIA is set up with secured access via the public Internet, at least with user identification, password protection and security protocol, such as Secure Socket Layer (SSL).

2. Method as claimed in claim 1, wherein the services are utilizable at least by the contract customers of the Internet service provider.

3. Method as claimed in claim 1, wherein the additional service platform comprises a hard and software platform preferably physically independent of the ISP.

4. Method as claimed in claim 1, wherein the additional service platform, optionally partially or completely, comprises a software platform on the same hardware of the ISP, with the independence being realized through different port addresses, different software processes, different databases, or at least a different access procedure onto the same data base.

5. Method as claimed in claim 1, wherein the OIA platform is made available to any Internet customers who are not contract customers of the ISP services, and the contract customers have at their disposal special advantages in particular through the coupling of the ISP platform and the OIA platform, thereby that they can access ISP services via the OIA Internet access or ISP services in the OIA platforms are made available including data copy and data transfer.

6. Method as claimed in claim 1, wherein the administration of the Internet access optionally also takes place via the Internet access.

7. Method as claimed in claim 1, wherein a redirection or a copy of at least services and data from the servers and databases of the ISP takes place into the server databases of the OIA platform via an interface, which is secured against unintentional and unauthorized access preferably by means of at least one of filter technique and firewall, with this interface preferably not being accessible to at least one of Internet traffic and customer access.

8. Method of coupling online and Internet services subscribed from Internet Service Provider, for providing general and personalized services as well as personal customer data of online services comprising the steps of providing worldwide access to a customer by means of a customer terminal to telecommunication networks and Internet service providers by means of a secured access via an Internet interface of the Internet service provider and at least one firewall, for the purposes of utilizing, setting up, and changing these services irrespective of a particular telecommunication network and irrespective of a particular customer terminal employed, the Internet service provider comprising an Open Internet Platform (OIA) comprising a router, a web server and a mail server coupled by a connection interface with the Online platform of the Internet service provider to allow an ISP customer to utilize a service offer via the Internet; and redirecting an ISP mail account subscribed services provided by the Internet service provider from the ISP into the OIA platform to provide the customer access independent of a customer's location, independent of customer terminal and independent of telecommunication access network used by the customer, the administration of the Internet access taking place at least on a remote access server (RAS) side through the ISP contract customer, and
   wherein the additional service platform OIA is set up with secured access via the public Internet, at least with user identification, password protection and security protocol, such as Secure Socket Layer (SSL).

9. Method of coupling online and Internet services subscribed from Internet Service Provider for providing general and personalized services as well as personal customer data relating to online services comprising the steps of:
   (a) providing access to Internet networks via secure access by means of a customer terminal;
   (b) permitting a customer to use services provided by an Internet service provider including to utilize, set up and make changes to the provided services;
   (c) equipping the Internet Service Provider (ISP) with an online platform comprising at least one router coupled by means of a connection interface to an Open Internet Platform (OIA) comprising a router, a web server and a mail server for accessing information such as customer's location and communication network used by the customer;
   (d) redirecting an ISP mail account subscribed services from the ISP into the OIA platform in order for the customer to obtain access that is independent of the customer's location, independent of a particular customer terminal and independent of a telecommunication access network used by the customer,
   (e) whereby a customer may obtain access that is independent of the customer's location, independent of customer terminal and independent of telecommunication access network used by the customer, the administration of the Internet access taking place at least on a remote access server (RAS) side through the ISP contract customer; and
   wherein the additional service platform OIA is set up with secured access via the public Internet, at least with user identification, password protection and security protocol, such as Secure Socket Layer (SSL).

* * * * *